United States Patent [19]
Talbot et al.

[11] 3,789,964
[45] Feb. 5, 1974

[54] APPARATUS FOR SUPPLYING SLUGS OF COOKIES IN PRESELECTED SIDE-BY-SIDE GROUPS FOR BAGGING

[75] Inventors: Richard C. Talbot; Edward Rose, both of Skokie; Robert A. Roth, Chicago, all of Ill.

[73] Assignee: Peters Machinery Company, Chicago, Ill.

[22] Filed: Nov. 30, 1972

[21] Appl. No.: 310,970

Related U.S. Application Data

[62] Division of Ser. No. 173,473, Aug. 20, 1971, Pat. No. 3,719,020.

[52] U.S. Cl. ................................ 192/29, 74/395
[51] Int. Cl. ..................... F16d 71/00, F16h 35/06
[58] Field of Search..... 192/28, 29, 33; 74/395, 396

[56] References Cited
UNITED STATES PATENTS

| | | | |
|---|---|---|---|
| 3,318,341 | 5/1967 | Nollet | 74/395 X |
| 1,630,183 | 5/1927 | John | 172/29 |
| 1,797,025 | 3/1931 | Sarheim et al. | 192/29 |
| 3,166,947 | 1/1965 | Hendershot | 74/395 X |
| 3,683,875 | 8/1972 | Chadwick | 74/395 X |

FOREIGN PATENTS OR APPLICATIONS

| | | | |
|---|---|---|---|
| 41,456 | 1/1930 | Denmark | 74/395 |

Primary Examiner—Allan D. Herrmann
Attorney, Agent, or Firm—Hill, Sherman, Meroni, Gross & Simpson

[57] ABSTRACT

Phase selector and reduction drive mechanism, for effecting operation of a member in phase relation with respect to at least one other member. The phase selector includes a drive shaft, a driven shaft forming a drive member for the one other member, a disk freely mounted on the driven shaft and carrying two idler sprockets freely rotatable about axes parallel to the axis of rotation of the driven shaft and a drive sprocket on the driven shaft. An endless chain on the drive shaft is trained from the sprocket on the drive shaft along the periphery of the disk about one idler sprocket and inwardly therefrom about the drive sprocket on the driven shaft and outwardly from said drive sprocket to and about the second idler sprocket and about the periphery of the disk to the sprocket on the drive shaft. The disk forms an angular adjustment means for adjusting the phase of the driven shaft and members driven therefrom and is adjustably moved about the axis of the driven shaft by a crank and threaded shaft which also serves to hold the disk from rotation. The crank and threaded shaft are thus operable to adjustably move the disk to conform the phase relation of the drive to the at least one other member, in accordance with the changes in speed of travel of the drive shaft.

12 Claims, 11 Drawing Figures

APPARATUS FOR SUPPLYING SLUGS OF COOKIES IN PRESELECTED SIDE-BY-SIDE GROUPS FOR BAGGING

This application is a divisional application of our application Ser. No. 173,473, filed Aug. 20, 1971, now U.S. Pat. No. 3,719,020 dated Mar. 6, 1973, the subject matter of which is incorporated herein by reference, and relates in particular to a phase selector and reduction drive mechanism for effecting operation of one member in phase relation to a second member in accordance with a predetermined number of cycles of operation.

FIELD OF THE INVENTION

This invention relates generally to apparatus for segregating and supplying slugs of cookies to a preselected number of bagging stations for bagging, in which the number of cookies in each slug and number of slugs delivered for bagging is at the selection of the operator of the machine.

PRIOR ART

This invention is an extension of the developments of the tray loader of U.S. Pat. No. 3,290,859, dated Dec. 13, 1966 and the Richard C. Talbot application for patent for "Converger and Feeder for Cookies for Wrapping," Ser. No. 74,418, filed Sept. 22, 1970, which patent and application are assigned to the assignee of the present invention.

SUMMARY, ADVANTAGES AND OBJECTS OF THE INVENTION

Cookies are transferred from the sandwich machine and grouped in slugs of a preselected number of cookies in each slug, and delivered to a transfer conveyor transferring a plurality of slugs in side-by-side relation along drop gates disposed over a drop chute, converging the cookies for delivery to a slug conveyor, and depositing a slug of cookies between each pair of flights of the slug conveyor in a continuous operation. The transfer conveyor is driven in dwells and the drop gates of the slug conveyor open during each dwell and deposit the cookies into a drop chute which converges the groups of slugs and drops the slugs between the flights of the slug conveyor. The slug conveyor carries the slugs of cookies for deposit into from one to six bagging stations and delivers the cookies to the selected bagging stations through drop chutes, operable to drop the cookies into side-by-side troughs corresponding to the number of slugs delivered. A slug pusher operating in timed relation with respect to the dropping of cookies to the bagging station drop chute, pushes the cookies along converging troughs fitting into the mouths of bags extending along the troughs. The completion of pushing the cookies into the bag may be a manual operation, after which the bags may be heat-sealed by a machine separate from the bagging machine. The drop gates of the slug conveyor open to deliver the slugs to the bagging stations in staggered relation with respect to each other, to balance the load on the machine. As for example, where six bagging stations are in use, the slugs may be dropped into stations four, five, two, six, three and one or in any other preselected order.

The bagging stations are spaced along opposite sides of the slug conveyor and separate jack shafts are provided for the bagging stations at each side of the machine. Change speed gearing is provided in the drive to the jack shafts to drive the jack shafts at speeds corresponding to the groups of slugs to be bagged, and independent phase selector drives are provided between the jack shafts and the bagging stations, and drive individual cams and cranks at each station controlling dropping of the slugs of cookies from the slug conveyor, dropping the slugs of cookies from the drop chute into the bagging trough and the operation of pushing the cookies along the bagging trough into the bag. The timing of the dropping of cookies from the slug conveyor, the dropping of the cookies from the drop chute to the delivery trough, and the pushing of the cookies may be varied at each bagging station through the positioning of the cams by the phase selector drives in accordance with the number of groups of slugs to be bagged and the selected number of stations to be operated, to assure the continuous dropping of the cookies from the slug conveyor to the preselected bagging stations with no piling up or spilling of cookies, or gaps or interruptions in filling of the slug conveyor and the bagging of cookies at the preselected bagging stations.

A principal advantage of the invention is the provision of a phase selector drive mechanism at each bagging station, driven in accordance with the speed of travel of the slug conveyor, attaining the release of slugs from the slug conveyor and drop chutes to the bagging station at the proper timed intervals, which phase selector drive may vary the phases of the operating parts of the apparatus in accordance with the number of articles to be loaded, the number of stations in use and the speed of travel of the slug conveyor to keep the dropping and pushing operations in phase with travel of the slug conveyor in a simple operation by the operator of the machine.

A principal object of the invention, therefore, is to provide a simplified reduction drive mechanism in an apparatus for bagging articles, such as cookies at a plurality of bagging stations in which the mechanism may change the phase of operation of dropping and bagging articles, at any one of a number of preselected stations in a simple and expeditious manner, assuring no interruption in the bagging or packaging of the articles.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

MACHINE IN GENERAL AND TRANSFER TO SLUG CONVEYOR

Figure 1:
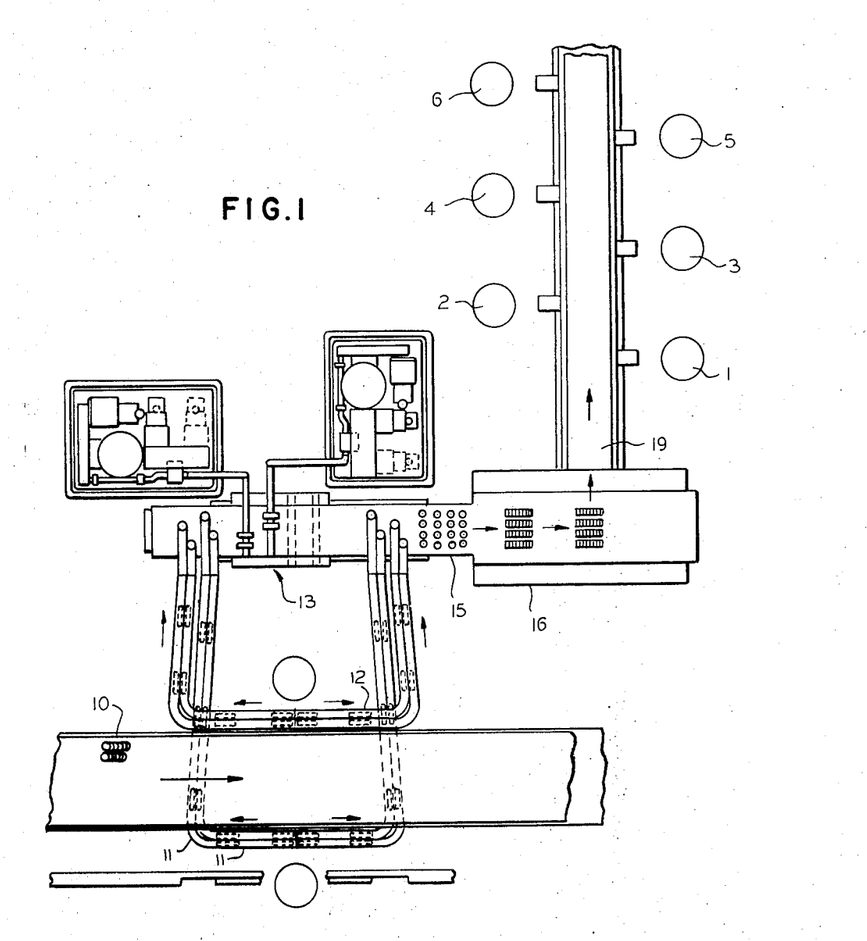
FIG. 1 is a diagrammatic plan view of a cookie bagging apparatus constructed in accordance with the principles of the present invention.
Figure 2:
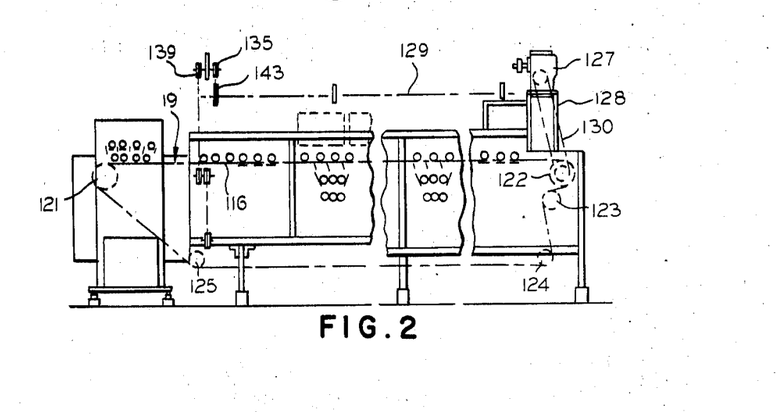
FIG. 2 is a diagrammatic view in side elevation of the bagging apparatus shown in FIG. 1.
Figure 3:
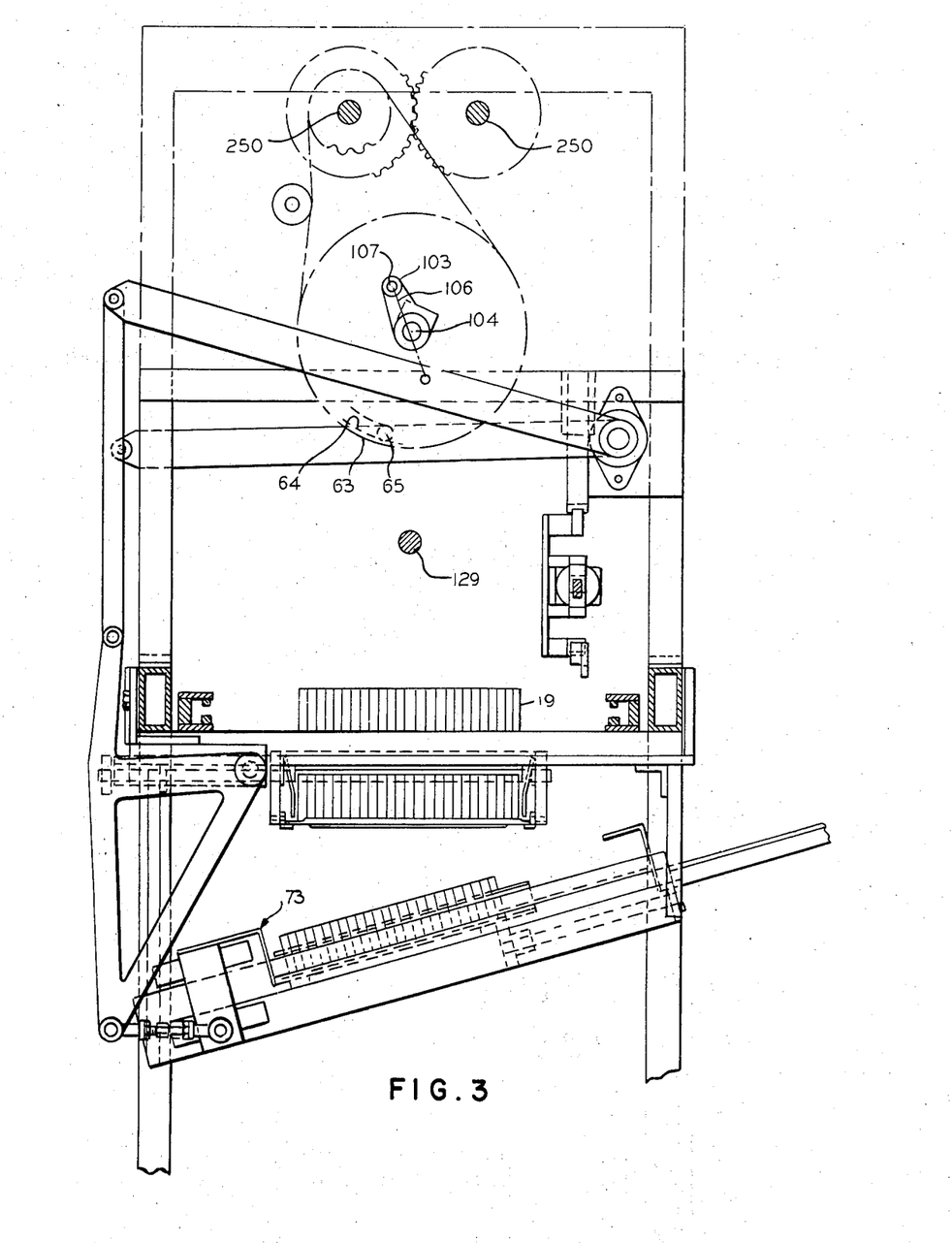
FIG. 3 is a diagrammatic fragmentary sectional view illustrating the slug conveyor drop chute and bagging chute at a bagging station, and generally showing the drive to the pusher pushing groups of cookies along the bagging chute for bagging.

In FIG. 1 of the drawings, we have diagrammatically shown in plan, a conveyor 10 conveying cookies from a bake oven (not shown). The cookies are taken by hand from the conveyor 10 and transferred to side-by-side vibratory feeder troughs 11 on one side of the conveyor, and into the vibratory feeder troughs 12 on the opposite side of the conveyor 10, and fed to a sandwich machine 13 coating the cookies with cream and making the cookies into sandwiches in a manner similar to that shown and described in U.S. Pat. No. 2,936,557, so not herein shown or described further.

From the sandwich machine, the sandwiched cookies are transferred in rows, herein shown as being in four rows, to a counting conveyor 15, separating the rows of cookies into slugs of a preselected number and delivering the slugs in side-by-side relation to a transfer conveyor 16. The transfer conveyor 16 transfers the cookies along drop gates (not shown) which are movable to release the slugs of cookies to the space between the flights of a slug conveyor 19, in timed relation with respect to travel of the slug conveyor, to fill the space between each flight of the slug conveyor upon traveling movement thereof. The counting conveyor, transfer conveyor and drop gates are shown and described in U.S. Pat. No. 3,290,859, so need not herein be shown or described, except insofar as the transfer conveyor and drop gates cooperate to continuously fill the flights of the slug conveyor as traveling from the discharge of the transfer conveyor, along and between a series of bagging stations one, three and five on one side of said slug conveyor and two, four and six on the opposite side of said slug conveyor.

The transfer conveyor 16 is driven from the mechanism driving the counting conveyor 15, in dwells and the cookies are discharged during each dwell. As shown in FIG. 25, the drive to said transfer conveyor includes a drive shaft 18 driven from a motor 24 through a phase variator 34 and a suitable drive train including change speed gearing 38. The change speed gearing synchronizes the speed of the shaft 18 of the counting conveyor leading from the sandwich machine to give the proper number of revolutions per slug, and the proper number of cookies going into a slug and coordinates the speed of travel of the transfer conveyor with the slug conveyor. The phase variator 34 synchronizes the timing of the drop from the transfer conveyor to the slug conveyor.

BAGGING STATION SELECTORS AND CAM DRIVE MECHANISM

Figure 4:
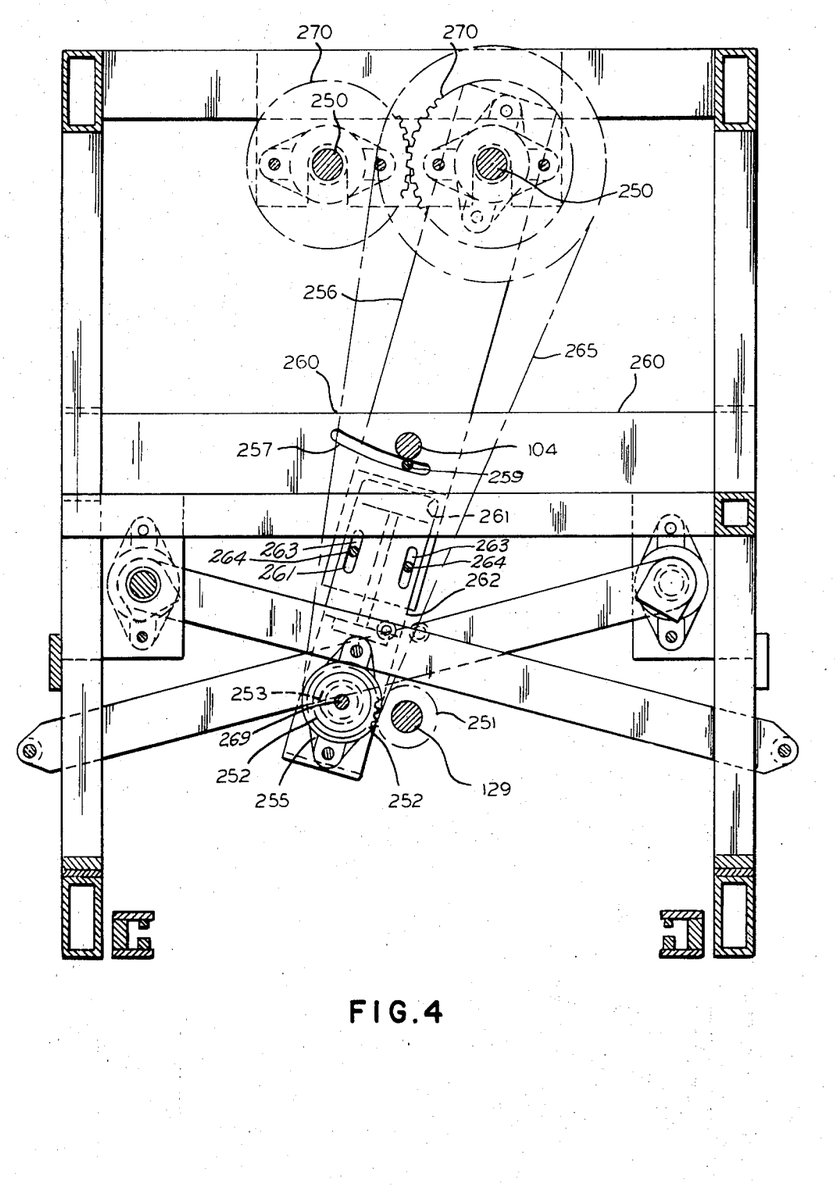
FIG. 4 is a fragmentary transverse sectional view illustrating the change speed drive to the jack shafts for driving the dropping and pushing mechanism at the bagging stations at each side of the machine.

FIGS. 4 to 11 inclusive illustrate the drives to the various operative cams and cranks at each bagging station for varying the speeds of the cams and cranks and the phases of operation thereof, in accordance with the number of bagging stations in operation, and the number of slugs delivered to each bagging station during each cycle of operation of the bagging station drop gate and pusher as in our parent U.S. Pat. No. 3,719,020. FIG. 4 shows a line shaft 129 in transverse section and shows parallel jack shafts 250 disposed above said line shaft. Each jack shaft is provided to drive the drop gate and pusher operating mechanism at each side of the main frame. The line shaft 129 has a spur gear 251 mounted thereon and keyed or otherwise secured thereto, to be driven therefrom. The spur gear 251 meshes with a change speed gear 252 mounted on a shaft 253 and removably keyed or otherwise secured thereto. The shaft 253 is journalled in a bearing bracket 255 mounted on an arm 256. The cross frame member 260 in turn is mounted for adjustable movement about the axis of a jack shaft 250. The arm 256 has a slot 257 extending partially thereacross and struck from an arc, the center of which arc is the axis of the jack shaft 250, on which said arm 256 is mounted. A bolt 259 is carried in said arm 256 and extends through the slot 257 to retain the arm 256 in position when the proper change speed gear 252 is in mesh with the gear 251.

The lower end portion of the arm 256 has a recessed portion 261 extending therealong forming a slidable guide for an extensible end portion 262 of said arm 256. The extensible end portion 262 is provided with a pair of slots 263 through which extend bolts 264, which may have nuts (not shown), threaded on the ends thereof, to positively hold the extensible end portion 262 to the arm 256 and maintain the required spacing between the shaft 250 and shaft 253 to maintain the proper tension on a drive chain 265 meshing with a sprocket (not shown) keyed on the opposite end portion of the shaft 253 from the change speed gear 252. The chain 265 drives the jack shaft 250 through a sprocket 267 keyed or otherwise secured to said jack shaft.

Figure 11:
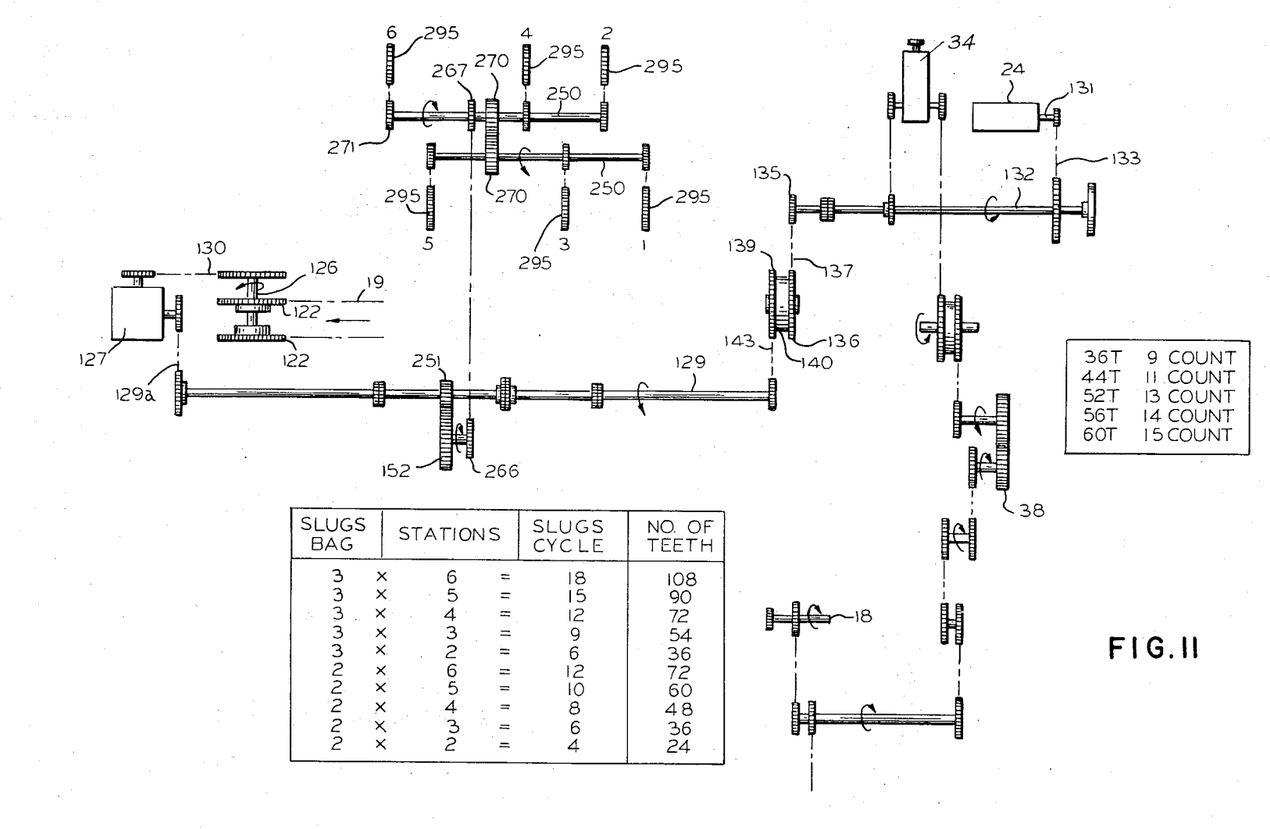
FIG. 11 is a diagrammatic view diagrammatically showing the drive connections to the transfer conveyor, slug conveyor and differentials at each bagging station.

The change speed gear 252 is preferably keyed to the shaft 253 and is retained to said shaft by a bolt 269 threaded in said shaft and abutting a washer disposed between the head of the bolt and said change speed gear. The change speed gear 252 may be removed and replaced with a change speed gear of either a greater or a smaller number of teeth in accordance with the desired speed of operation of the jack shafts 250. The chart in FIG. 11 gives the number of teeth in the gear 252 when driven by a 24 tooth pinion for bagging two or three slugs to a bag, by the use of from two to six bagging stations and shows that as the number of slugs to a bag and the bagging stations in use increase as the teeth of the gear 252 increase, it being understood that the speed of each jack shaft is 8/3 revolutions per slug cycle regardless of the number of stations or the number of slugs loaded. The line shaft 129 is driven at a fixed speed of 2 revolutions per slug in the slug conveyor 19.

It should here be understood that a slug cycle is the number of slugs dropped out of the slug conveyor during one complete operation of all of the bagging stations used. In a 12 slug cycle where four stations are used, 12 consecutive slugs will pass the four stations used, all of the slugs being dropped out of the slug conveyor in the proper sequence in groups of three. The jack shaft 250 makes 8/3 revolutions per cycle for any condition of stations and slugs per bag.

The jack shafts 250 are connected to rotate together in opposite directions at the same rates of speeds through meshing spur gears 270. The right-hand jack shaft 250 in FIG. 4 serves as a drive shaft for bagging stations two, four and six, while the left-hand jack shaft 250 serves as a drive shaft for bagging stations one, three and five.

Each jack shaft 250 has three sprockets 271 spaced therealong and keyed or otherwise secured thereto, one sprocket being provided for each bagging station.

PHASE SELECTOR DRIVE FROM JACK SHAFT TO CAM SHAFT

A separate cam shaft 104 and a phase selector drive 273 is provided for driving the associated cam shaft, from its jack shaft at bagging stations one to six. The phase selector drives at each bagging station are the same so only one phase selector drive need herein be shown and described. The cam shaft 104 extends in the direction of travel of the slug conveyor and is journalled on frame member 274 forming a part of the main frame of the machine, in bearing boxes 275 mounted on and extending up-wardly of said frame members. A separate crank 103 is provided for driving each slug pusher 73 back and forth and is keyed or otherwise secured to one end of said cam shaft 104 in spaced relation with respect to the adjacent bearing box 275.

Figure 5:
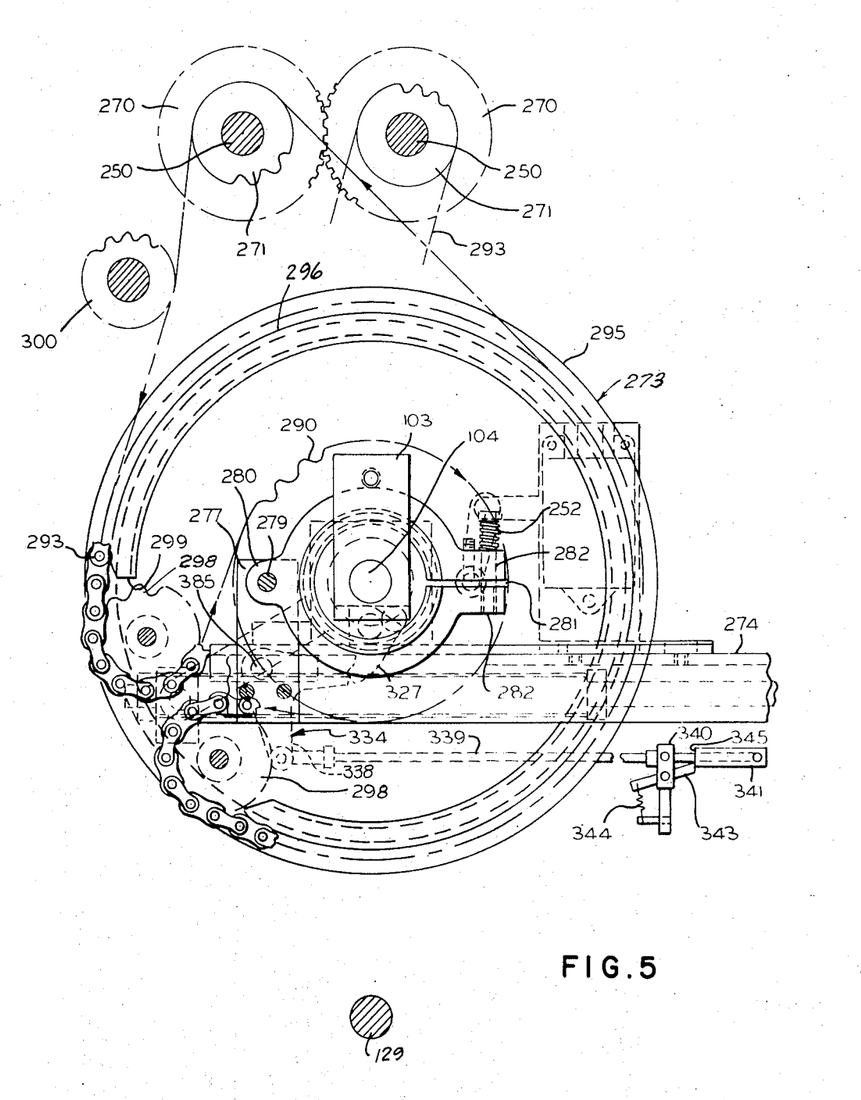
FIG. 5 is a view in transverse section, illustrating the differential mechanism driven from the jack shaft, for driving a cam shaft at a bagging station, controlling the dropping and discharge operation of the slugs of cookies.
Figure 6:
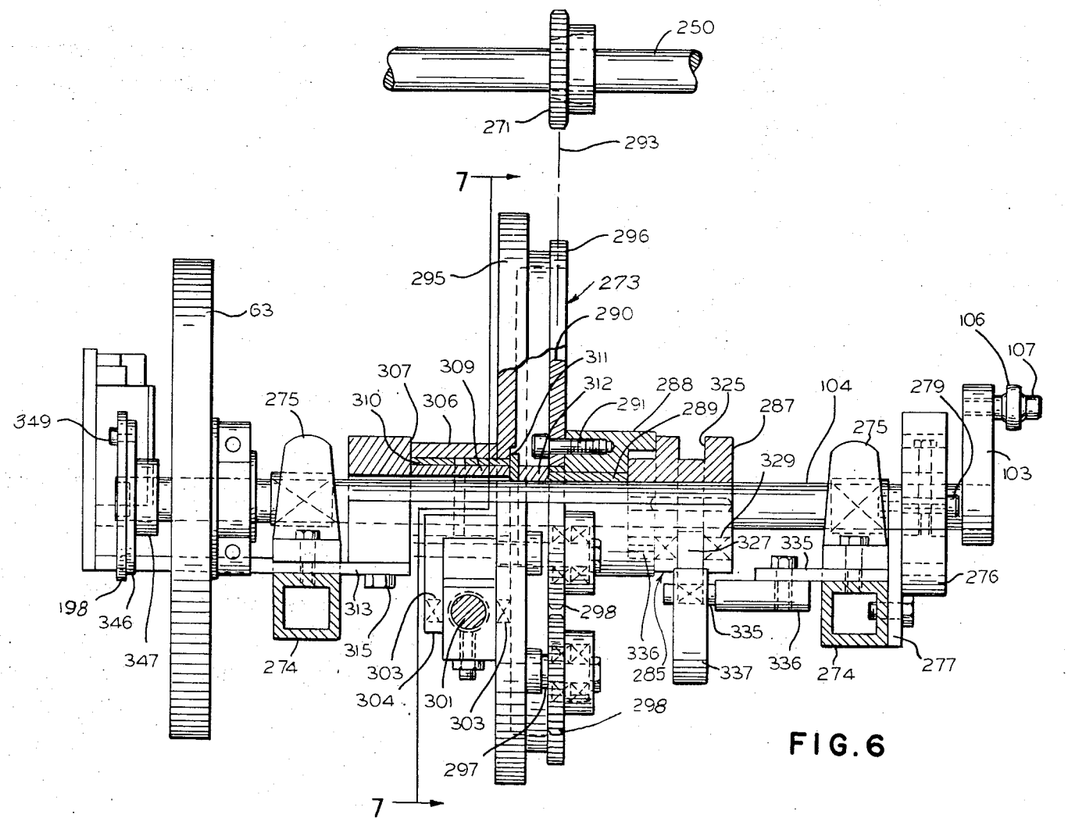
FIG. 6 is a partial fragmentary longitudinal sectional view taken through the differential and showing the cams on the cam shaft and the crank for effecting operation of the dropping and pushing mechanism at a bagging station.

A drag brake 276 is disposed between the crank 103 and its adjacent bearing box 275. As shown in FIGS. 5 and 6, a bracket plate 277 is secured to the outer side of the frame members 274 as by machine screws, and extends upwardly therefrom and forms a mounting adjacent its upper end for a bolt 279. The bolt 279 extends through a boss 280 extending radially of the periphery of the drag brake and forms a pivotal mounting for said drag brake. The drag brake is in the general form of a split collar having a split portion 281 having lugs 282 extending outwardly of the periphery of said drag brake, the facing sides of which define the split portion 281 of said drag plate. A machine screw is threaded in the lower lug 282 and extends loosely through the upper lug. A spring 283 biases the lugs 282 toward each other to maintain a drag on the cam shaft 104 and prevent overrunning thereof in a conventional manner.

The drive to the cam shaft includes an overrunning clutch 285 of a conventional form including a driven member 287 keyed or otherwise secured to the shaft 104 and a driving member 288 for driving said driven member through the usual overrunning clutch jaws. Said driving member 288 is journalled on the shaft 104 on a bearing 289 and abuts a drive sprocket 290 at its end opposite the driven member and is secured to said sprocket as by machine screws 291 to be driven therefrom. The sprocket 290 is meshed with and driven from an endless chain 293 driven from a sprocket 271 on the jack shaft 250.

Journalled on the cam shaft 104 adjacent the sprocket 290 and at the opposite side thereof from the overrunning clutch, is a disk 295 having a generally cylindrical periphery, and forming an adjustment means for the cam shaft 104 and crank 103 and cam disk 63 and 198 on said cam shaft. The disk 295 has a partial annular ring 296 spaced to one side thereof, and extending about the sprocket 290, and shown in FIG. 6 aS being formed integrally with said disk 295. The disk 295 also forms a mounting for parallel shafts 297 extending parallel to the cam shaft 104 and having idler sprockets 298 freely journalled thereon. The idler sprockets 298 extend within an open portion 299 of said partial ring 296 and are in direct alignment with the sprocket 290.

The drive chain 293 is trained about its sprocket 271 under a tension idler 300 along the outer periphery of the partial ring 296 about one idler sprocket 298 inwardly therefrom about the drive sprocket 290 and outwardly of said drive sprocket about the other idler sprocket 298. From the outgoing idler sprocket 298, the chain 293 is trained about the periphery of the partial ring back to the drive sprocket 271. The partial ring 296 has a diameter equivalent to a sprocket having twice the pitch diameter or number of teeth of the sprocket 290. During the drive to the cam shaft 104, the disk 295 is held from rotation, and the sprocket 290 is driven from the sprocket 271 and chain 293 in the manner just described.

Figure 7:
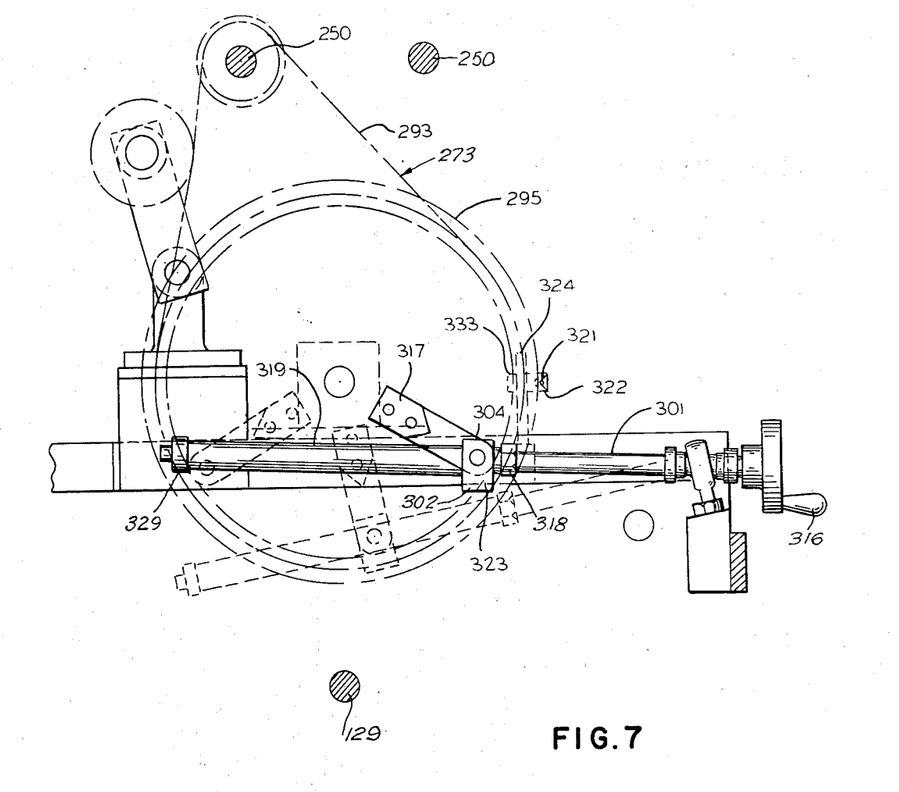
FIG. 7 is a fragmentary detail view illustrating the adjustment means for adjusting the differential and the cams and crank shaft in accordance with the groups of slugs to be bagged.
Figure 8:
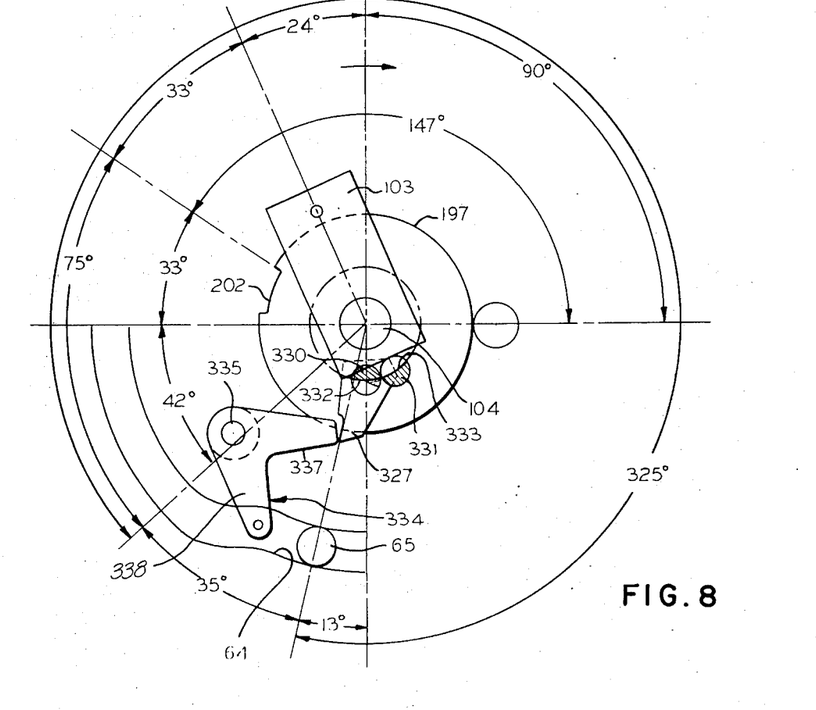
FIG. 8 is a diagrammatic view diagrammatically showing the cam controlling the dropping of cookies from the drop chute to the bagging chute and controlling the dropping of cookies from the slug conveyor into the drop chute showing the mechanism for rendering a bagging station inoperative, in position to render a bagging station inoperative.
Figure 9:
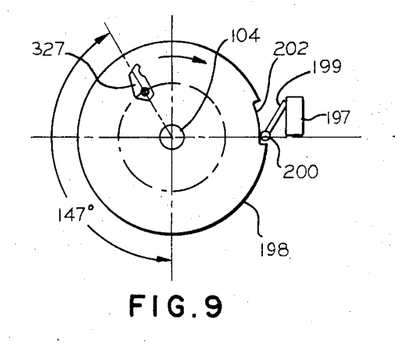
FIG. 9 is a diagrammatic view showing the cam and microswitch for controlling dropping of the cookies from the slug conveyor.
Figure 10:
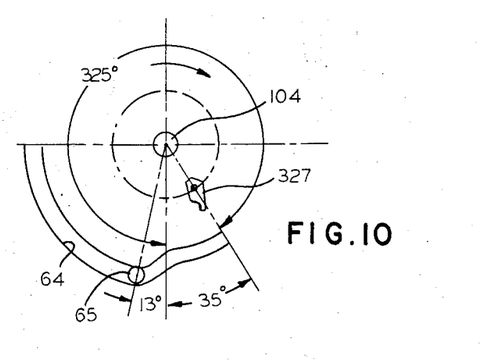
FIG. 10 is a diagrammatic view, diagrammatically showing a portion of a cam operating the drop gates at a bagging station showing the mechanism in an operative position.

The disk 295 forms an angular adjustment means for adjusting the phase of the cam shaft 104 and cams and crank thereon, and is adjustably moved about the axis of the cam shaft 104 by rotation of a threaded shaft 301, threaded in a block 302 trunnioned to one side of said disk on trunnion bearings 303 (FIGS. 6 and 7). One trunnion bearing is carried in said disk and the other is carried in an arm 304 of a bracket member 317 secured to and extending along said disk and spacing the arm 304 in parallel relation with respect to the face of said disk.

The disk 295 has a hub 306 extending outwardly therefrom in an opposite direction from the partial ring 296, and abutting a shouldered portion 307 of a shouldered sleeve 309. A bearing 310 forms a bearing for said hub on the reduced diameter portion of said shouldered sleeve. A thrust bearing 311 engages the inside of the shouldered sleeve 309, the bearing 310 and disk 295 and is spaced from the sprocket 290 as by a spacer 312. The shouldered sleeve 309 is spaced radially from the shaft 104 and is mounted on a bracket plate 313 extending inwardly of a side frame member 274. A cap screw 315 is provided to retain said shouldered sleeve to said bracket plate to form a bearing support for the disk 295.

The angular timing position of the cam shaft 104 with respect to the slug conveyor 19 and the cam 63, crank 103 and cam 198 may be changed during operation of the machine, to synchronize dropping of the slugs, with the speed of travel of the slug conveyor. A hand crank 316 on the outer end of the threaded adjustment shaft 301 is turned by hand to rotate the disk 295 about its axis, by threaded engagement of said shaft 301 with the block 302. The chain 293 being meshed with its drive sprocket is locked by said drive sprocket 271 and jack shaft 250. As the disk 295 is turned by rotation of the hand crank 316, the idler sprockets 298, turned by said disk, the pinions 298 will be bodily moved about the axis of the cam shaft 104 and will walk about said chain in the manner of planetary pinions walking about the internal gear of a planetary geared reduction device. This will take up tension of the slack side of the chain and place slack on the normally tight side of the chain. This will turn the sprocket 290 and cam shaft 104 at an angle of travel stepped up three times with respect to the angle of travel of the disk 295.

As for example, the travel of the nut or block 302 of 1 inch attained by rotation of the hand crank 316 and threaded shaft 301 will turn the disk 295 through an angle of 13 ⅓° and will adjustably move the cam shaft 104 through an angle of 40°.

The threads on the threaded shaft 301 and block 302 are of such a pitch, that one complete turn of the hand crank 316 and threaded shaft 301 will equal 5° of cam shaft adjustment, and 9 inches of travel of the threaded block or nut 302 will equal 120° of travel of the disk 295 and 360° of travel of the cam shaft 104.

A stop 318 is mounted on a housing 319 for the threaded shaft 301 and engages the nut 302 to limit adjustable movement of the disk 295 to a zero position of adjustment in one direction. A stop 329 on the opposite end of the housing 319 engages the nut 302 upon rotation of the disk 295 for 120°, and determining an opposite neutral position of the cam shaft 104.

A portion of the periphery of the disk 295 may be calibrated in degrees from 0° to 360° and subtends an angle on the periphery of the disk 295 of 120°. An indicator arrow 321 is positioned by a rod 322 to extend over the portion of the disk which is calibrated, and indicate the position of said disk as adjusted by the hand wheel 316. The rod 322 in turn is mounted on and extends from a block 323 adjustably mounted on a vertical rod 324, mounted on the bracket plate 313, and extending upwardly therefrom (FIG. 7).

The overrunning clutch 285 at each bagging station is used to manually disconnect the station when not in use. As shown in FIGS. 5 and 6 and as diagrammatically shown in FIG. 8, the driven member 287 has an outwardly opening slot 325 extending thereabout having a clutch dog 327 pivoted within said slot on a pviot pin 329, journalled in said driven member to pivot with said dog. The pivot pin 329 has an extension 330 extending within the driving member 288 and forming a driving dog for the overrunning clutch. The driving dog is adapted to be engaged by a driving dog 331 in the driving member 288. The dogs 330 and 331 having facing circumferential surfaces 332 and 333 which clear each other and accommodate the driving member to freely rotate relative to the driven member, when the dog 327 is in the position shown in FIGS. 6 and 8. A suitable spring (not shown) may be provided to provide a driving connection between the dogs 330 and 331 and to bias said dogs to engage each other and thereby engage the clutch. The dog 327 is held in position to disconnect the drive shaft 104 by a bell crank 334, pivoted intermediate its ends on a pivot pin 335 mounted on a bracket 336 extending inwardly of the top surface of a side frame member 274.

The bell crank 334 has a lever arm 337 engaging the end of the dog 327 to disconnect the drive to the cam shaft 104 and has an opposite depending lever arm 338 having a link 339 pivotally connected thereto and extending outwardly therefrom through a bracket member 340. A pull handle 341 is mounted on the outer end of the rod 339 and is effective to release the arm 331 of the bell crank from the dog 327 to thereby release said dog 327 to pivot outwardly and effect a driving connection between the clutch dogs 330 and 331, in a manner well known to those skilled in the art so not herein shown or described further. A latching lever 343 is pivotally mounted on the bracket 340 intermediate its ends and is biased by a spring 344 to engage a shouldered end 345 of the pull handle 341 and hold the bell crank 334 in position to effect disengagement of the 1 revolution clutch, and thereby disconnect an associated bagging station, when it is desired to take a particular bagging station out of service.

It should here be understood that as long as the dog 327 is free, and the bell crank 334 is out of engagement with said dog, the shaft 104 will rotate until it is moved into position to engage said dog. The bell crank being pivoted about a fixed axis relative to the dog will always stop rotation of the cam shaft 104 in the same position and said cam shaft will always start to rotate from the same position upon release of the dog, to thereby prevent the shaft 104 from getting out of phase.

The cam 198 is mounted on and extends radially of a plate 346 extending radially of a hub 347, keyed or otherwise secured to the cam shaft 104 and rotatably driven thereby. A machine screw 349 is provided to detachably mount the cam 198 to the plate 346. An interengaging connection (not shown) may also be provided between said plate and cam to assure positive rotation of said cam with the plate 346 and to properly position said cam relative to said plate. A different cam 198 is provided for each change in stations in operation and change in the number of slugs delivered at each station to assure a continuous flow of slugs to the drop chutes 45 and bagging troughs 47.

It should be understood that while cookies and bagging stations are referred to herein, that the apparatus may be used for loading and packaging a wide variety of articles which are supplied in groups or slugs, and that the bagging stations may be various types of packaging stations in which the groups of slugs may be supplied for packaging by mechanized packing machines.

We claim as our invention:

1. In a phase selector and reduction drive mechanism and in combination with a cam shaft having at least one cam thereon, for effecting operation of a member in phase relation with respect to a second member in accordance with a predetermined number of cycles of operation,
   a disk coaxial with said cam shaft,
   a pair of spaced idlers freely journalled on said disk for rotation about axes spaced radially from and parallel to the axis of rotation of said cam shaft,
   means holding said disk from rotation,
   a driven member coaxial with the center of said disk, a drive shaft, an endless flexible drive member driven from said drive shaft, means proportionate to the diameter of said driven member for training said flexible drive member about said idlers and driven member upon holding said disk from rotation and means holding said disk from rotation and selectively changing the angular position of said disk, said idlers reacting against said endless flexible drive member driven from said drive shaft upon bodily movement thereof about said cam shaft and rotatably driven by said flexible drive member to effect a change in the angular position of said cam shaft relative to said disk an amount greater than angular movement of said disk.

2. The phase selector of claim 1, including a handwheel and a drive connection from said handwheel to said disk for rotating said disk to change the phase of operation of said cam shaft.

3. The apparatus of claim 1, wherein the driven member is a sprocket secured to said cam shaft and rotated thereby, wherein the flexible drive member for driving said idlers and driven member comprises an endless chain meshing with said sprocket and trained about said idlers and driven member and having driving engagement therewith.

4. The apparatus of claim 3, including a semi-annular ring spaced from and attached to said disk and extending about said cam shaft, coaxially therewith and having an outside diameter proportionate to the number of teeth in said sprocket, and opening through the periphery of said ring on opposite sides of said idlers, the periphery of said ring forming a guide means for said endless chain, guiding said chain to and from said idlers and accommodating said chain to be trained about said driven sprocket on said cam shaft.

5. The apparatus of claim 4, including a tension idler maintaining tension on said endless chain, whereby rotation of said disk to vary the change in phase of operation of said cam shaft effects tensioning of the slack side of the chain against said tension idler, to effect angular movement of said driven member and cam shaft and place slack on the normally tight side of the chain held from rotation by said jack shaft.

6. The phase selector of claim 5, wherein the drive connection from said drive member on said cam shaft to said cam shaft is an overrunning clutch driving said cam shaft in one direction, and wherein a stop member is provided and is selectively positionable to stop rotation of said clutch at a preselected position in the cycle of rotation thereof to disengage the driving connection to said cam shaft and to assure the stopping of said cam shaft in a preselected position with respect to the cycle of rotation thereof.

7. In a phase selector and reduction drive mechanism and in combination with a cam shaft having at least one cam thereon for effecting operation of a member in phase relation with respect to a second member in accordance with a predetermined number of cycles of operation, a sprocket on said cam shaft, a drive connection from said sprocket to said cam shaft, a jack shaft parallel to said cam shaft, means driving said jack shaft to maintain a constant number of revolutions, of said cam shaft per cycle of operation regardless of the number of cycles of operation, comprising a drive sprocket on said jack shaft, a driven sprocket on said cam shaft, a disk coaxial with said cam shaft, at least two idler sprockets carried by said disk and journalled for free rotation about axes parallel to and spaced radially from the axis of said cam shaft, means holding said disk from rotation and angularly moving said disk, a driven sprocket on said jack shaft, an endless chain meshing with said driven sprocket, means on said disk proportionate to the diameter of said driven sprocket training said chain first to one idler and accommodating said chain to be trained therefrom and said driven sprocket on said cam shaft and then about said second idler, and from said second idler back to said drive sprocket for driving said driven sprocket from said drive shaft upon the holding of said disk from rotation, said means holding said disk from rotation and angularly moving said disk being operable to adjustably move said disk to vary the phase of operation of said cam on said cam shaft in accordance with changes in the speed of travel of said jack shaft.

8. The phase selector of claim 7, including a tension idler between said drive sprocket on said drive shaft and said first-mentioned idler, maintaining tension on said endless chain, whereby the reaction of said chain against said sprocket on said jack shaft and the adjustable movement of said disk about the axis of said cam shaft will tend to take up slack on said endless chain against said tension idler and place slack on the normally tight side of the chain and effect adjustment of said driven sprocket on said cam shaft, and turning of said cam shaft and the cam thereon a greater angle of adjustment than the angle of travel of said disk.

9. The phase selector of claim 7, wherein the means on said disk training said chain first to one idler comprises a semi-cylindrical ring carried by said disk having a peripheral portion in alignment with said chain and proportionate to the diameter of said drive sprocket and having an open portion accommodating the training of said chain to and from said idler sprockets.

10. The phase selector of claim 9, wherein the driving connection from said sprocket on said cam shaft to said cam shaft is an overrunning clutch driving said cam shaft in one direction, and wherein a stop member is provided and is selectively positionable to stop rotation of said clutch at a preselected position in the cycle of rotation thereof, to disengage the driving connection to said cam shaft and to assure the stopping of said cam shaft in a preselected position with respect to the cycle of rotation thereof.

11. The phase selector of claim 7, wherein the means holding said disk from rotation and angularly moving said disk, comprises a handwheel, a screw rotated thereby a nut threaded on said screw and means pivotally connecting said nut to said disk for movement about an axis intersecting the axis of turning movement of said screw and perpendicular thereto, and spaced radially from the axis of rotation of said cam shaft.

12. The phase selector of claim 11, wherein the driving connection from said sprocket on said cam shaft to said cam shaft comprises an overrunning clutch driving said cam shaft in one direction and wherein a selectively positionable stop member is provided to stop rotation of said clutch at a preselected position in the cycle of rotation thereof, to disengage the driving connection to said cam shaft and to assure the stopping of said cam shaft in a preselected position with respect to the cycle of rotation thereof.

* * * * *